April 15, 1969  G. J. SCHUNK  3,438,134

MEASURING DEVICE

Filed Jan. 29, 1968  Sheet 1 of 2

George J. Schunk
INVENTOR
BY Kolisch & Hartwell
Attys.

George J. Shunk
INVENTOR
BY
Kolisch & Hartwell
Attys.

United States Patent Office 3,438,134
Patented Apr. 15, 1969

3,438,134
MEASURING DEVICE
George J. Schunk, 3265 Azalea Drive,
Salem, Oreg. 97302
Continuation-in-part of application Ser. No. 494,023,
Oct. 8, 1965. This application Jan. 29, 1968, Ser.
No. 706,215
Int. Cl. G01b 5/02
U.S. Cl. 33—143                                                8 Claims

ABSTRACT OF THE DISCLOSURE

A measuring device for infants including a tray with a floor and an upright border wall joined to and extending upwardly from such floor bounding a space for cradling an infant, there being an adjustable foot support received within the tray which is slidable along the length of the floor and which is brought up against the feet of an infant to produce measurements.

---

This application is a continuation-in-part of prior filed application entitled, "Measuring Device," filed Oct. 8, 1965, having Ser. No. 494,023, now abandoned.

The invention relates to devices for measuring the length of an infant (i.e., its height) characterized by a number of unique features, making it a practical and useful tool for pediatricians.

Recent studies have indicated the importance in charting the development of an infant, of noting its height at the time of birth and at regular periods thereafter. For the information to be useful, however, it is necessary that the measurements taken be truly accurate, as without accuracy it may seem that an infant has actually decreased in height over a month's time, whereas, in fact, his growth has been entirely normal. Although this need for accuracy should be obvious, many of the tools and procedures utilized at present to measure the height of infants produce results which are approximations only. This has caused many doctors to dispense with height measurements entirely.

One general object of the invention, therefore, is the provisions of a device for measuring an infant's height which makes possible the attaining of accurate measurements relatively easily.

It should be obvious that any instrument used in connection with the care of an infant, particularly immediately after its birth, should be readily cleanable and made sanitary. Present maternity wards have meticulous standards of cleanliness. Thus, yet another general object of the invention is to provide a device for measuring an infant's height which may readily be cleaned to prepare it for reuse.

Yet a further object of the invention is to provide a measuring device which is portable and easily moved by a nurse or other attendant. The device contemplated features a tray shaped to cradle an infant with the same placed therein, which can actually be used in transporting the infant. The tray preferably is devoid of sharp corners, and may be an integral molded plastic component of relatively light mass which is easily washed.

To obtain accuracy in a height measurement, it is important that an infant be positioned in a predetermined position during the taking of a measurement, and that this position be re-establishable each time a measurement is subsequently taken. The apparatus contemplated features a tray construction wherein an infant is readily placed in a standard position which is the same for all measurements taken, with the infant's head and body aligned. With the infant properly positioned, an adjustable foot support, which has a set position extending transversely of the longitudinal axis of the tray, may be brought up against the infant's feet. With the foot support so positioned, and without removing the infant from the apparaus, a scale may be read indicating the infant's height.

A doctor sometimes is required to make crown-rump measurements of a fetus, which involves a distance measurement which is considerably less than the usual height measurement of a newborn infant. To be truly versatile, the measuring device should be constructed to enable it to make such short measurements, as well as the longer measurement of an infant's full length. The measuring device contemplated can be used in performing both types of measurements with equal facility, with the subject being measured being in each case fully cradled within the tray. The adjustable foot support which is brought up against an extremity of the subject being measured is for the most part lodged within the tray and while so positioned is movable a substantial distance along the length of the tray. The subject measured need never protrude out from the tray, may always thus be kept isolated from the table or other support that supports the tray, and yet can be measured even though the measurement taken constitutes a distance which is considerably less than the length of the tray.

In a preferred embodiment of the invention, the tray is provided with an upright border wall comprising side walls that include elongated longitudinally extending rims adjacent upper margins of the side walls. These rims enable the tray to be lifted easily, with minimal chance of the tray slipping out from one's fingers. These rims may also be used as in one modification of the invention, as the means guiding the adjustable foot support contemplated.

These and other objects and advantages are attained by the invention, and the same is described hereinbelow in conjunction with the accompanying drawings, wherein.

Figure 1:
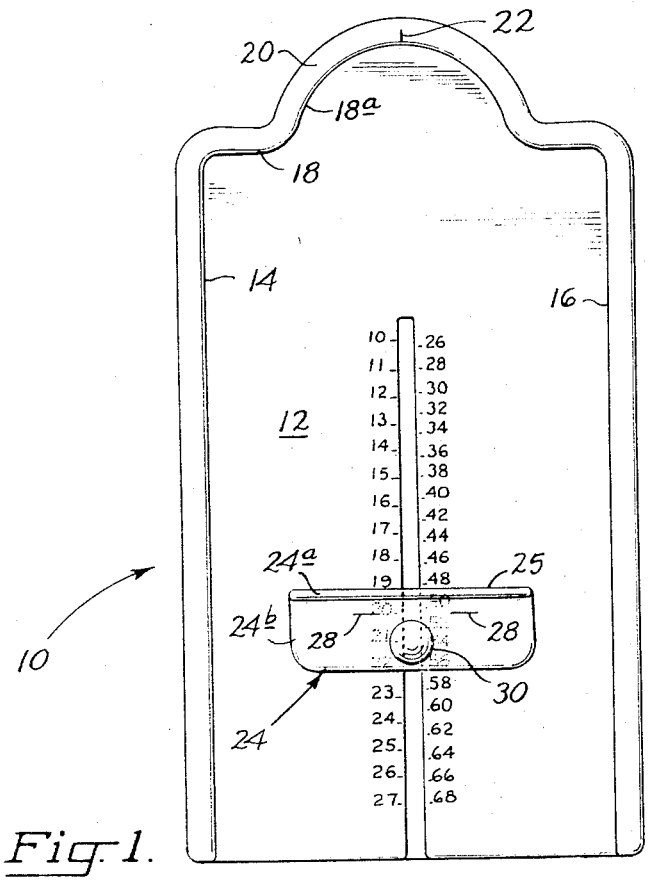
FIG. 1 is a top plan view of a measuring device as contemplated according to one modification of the invention, such device including an elongated tray and an adjustable foot support within the tray.
Figure 2:
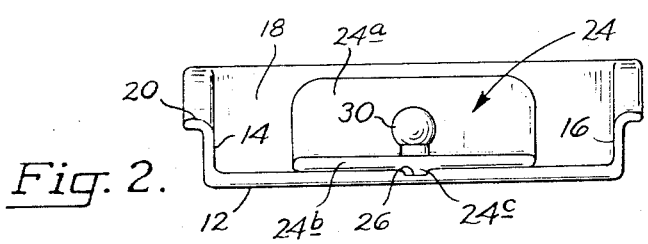
FIG. 2 is an end view of the tray shown in FIG. 1, looking at the bottom end of the tray in FIG. 1.
Figure 3:
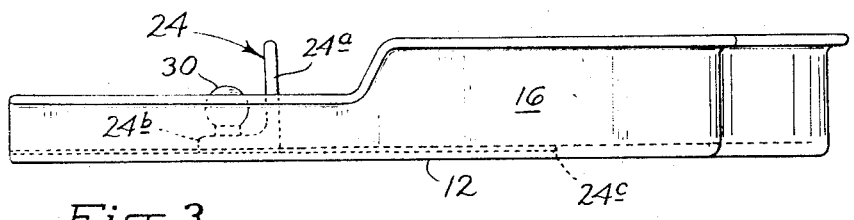
FIG. 3 is a side view of the tray illustrated in FIGS. 1 and 2.

Referring now to the drawings, and first of all more particularly to FIGS. 1, 2, and 3, the device illustrated in these figures comprises an elongated tray 10 having a floor 12, opposed upright side walls 14, 16, and an upright end wall 18. The side and end walls together constitute what is referred to herein as an upright border wall integral with and extending upwardly from floor 12. The tray, including its floor and such upright border wall, may be formed of an integral piece, and typically may comprise a molded plastic piece. The side and end walls of the tray bound a space on the top of the tray which receives an infant by cradling it. The side walls assist in the placing of an infant in a proper aligned position with the longitudinal axis of the tray. By cradling the subject being measured, soiling by such subject of regions outside and immediately adjacent the tray is prevented. In this regard, it should be noted that the floor of the tray, and its side and end walls, are imperforate.

End wall 18, viewing a plan of the tray as seen in FIG. 1, has a U-shaped outline in an intermediate portion thereof, indicated at 18a. This U-shaped portion is included for the purpose of receiving the head of an infant while cradling top and opposite sides of its head. Midway between the side walls, and inscribed into the elongated rim 20 which is provided as an integral part of upper margins of the side and end walls, is a line or indicator means 22. With an infant's head cradled in portion 18a, and centered as facilitated by reference to line 22, a standard position for the infant's head during the taking of a measurement is established.

Detachable from the tray, and mounted within it, is an adjustable foot support 24. This foot support in the modification illustrated comprises an elongated element of L-shaped cross section including flanges 24a, 24b set at right angles to each other. Flange 24a, which constitutes a foot-contacting plate portion, extends upwardly from the floor of the tray. With the ends of the element located inwardly of the upstanding side walls, the element is freely movable within the confines of the tray.

According to this intention, opposed, laterally spaced, elongated guide surfaces paralleling the longitudinal axis of the tray are provided, which guide the elements including flanges 24a, 24b for movement along the length of the tray with flange 24a maintained upright and with its longest dimension extending normal to the axis of the tray as shown. These guide surfaces are disposed above the base of the tray floor, whereby the floor is not parted by said surfaces. In this way the floor is not weakened, and its imperforate nature is maintained. Upper margins of these guide surfaces, along their lengths, are exposed to the top of the tray, which is necessary if the foot support is to move freely along the interior of the tray over a substantial part of the tray's length (a distance sufficient to enable both prone infants and crown-rump measurements to be taken).

Further explaining, it will be noted that formed in the floor is an elongated shallow groove 26 defined along opposite sides by opposed, elongated edges that constitute laterally spaced guide surfaces. Upper margins of these edges or guide surfaces join with the top of floor 12. An elongated rib 24c or rider, integrally formed with the base of flange 24b is snugly and slidably received within shallow groove 26. The groove, being shallow, does not part floor 12, thus to weaken the floor and render it perforate. The guide surfaces provided by the edges of the groove present an unobstructed runway for rider 24c extending a substantial distance along the length of the tray. If the groove is aligned with line 22, the groove may be used as a reference line indicating the midline of the tray.

It will be noted that in this modification of the invention, the upstanding border wall does not extend across the bottom end of the tray in FIG. 1, i.e., the border wall is open at this end of the tray. Further, groove 26 has an open end at the bottom end of the tray in FIG. 1. This promotes ease of cleaning as it enables swabbing of the groove along its length, with any material that may have collected in the groove being ejectable through the open end thereof.

Impressed into the top of floor 12, along either side of groove 26, are two rows of calibrations, one preferably being calibrated in centimeters and the other in inches. The rows of calibrations extend under the foot support.

It is preferred that the foot support be made of transparent material, such as a transparent plastic, and that hairlines, such as those shown at 28, be embedded in this plastic material, which hairlines function as sight means facilitating the taking of readings from the two rows of calibrations discussed. On looking directly downwardly at a hairline, and through flange 24b, the hairline will indicate directly the distance between face 25 of flange 24a and the inside of intermediate portion 18a at the location of the indicator line. It is important to note that the sight means proposed enables readings to be taken with an infant occupying the tray, since the hairlines are exposed to a viewer above the tray with the tray occupied. Thus, readings are possible without first removing the infant from the tray, which removal could cause a change in the position of the foot support and result in inaccuracy.

The foot support is moved along the longitudinal axis of the tray using handle 30 which projects upwardly from flange 24b.

Explaining how the device may be employed, the infant is placed inside the tray with its head against the U-shaped portion described and centered with respect to line 22. The infant may then be straightened out, and its feet made to lie on either side of groove 26. Foot support 24 may then be slid upwardly against the base of the infant's feet. In making a crown-rump measurement of a fetus, the head of the subject is likewise cradled in portion 22, and the foot support moved up against the rump. In this instance, of course, the distance measured is substantially less than when measuring the full length of an infant.

Considering now the modification of the invention shown in FIGS. 4 to 7, in this instance a tray 40 is provided including a floor 41 and an upright border wall 42 which extends completely about the tray. Thus, border wall includes side walls 43, 44, as well as opposed end walls 45, 46. By including end walls at opposite ends, the side walls are braced, making them more rigid, an important consideration especially when considering the type of adjustable foot support which is provided according to this modification of the invention.

As in the first modification of the invention, the floor, and the side and end walls may be formed as an integral piece as by forming them of molded plastic.

Extending along upper margins of the side and end walls is an elongated rim 48. This rim includes reaches 48a, 48b extending along the upper margins of the side walls. This rim is turned down at its outer edge, and as earlier discusssed facilitates lifting of the tray.

Figure 4:
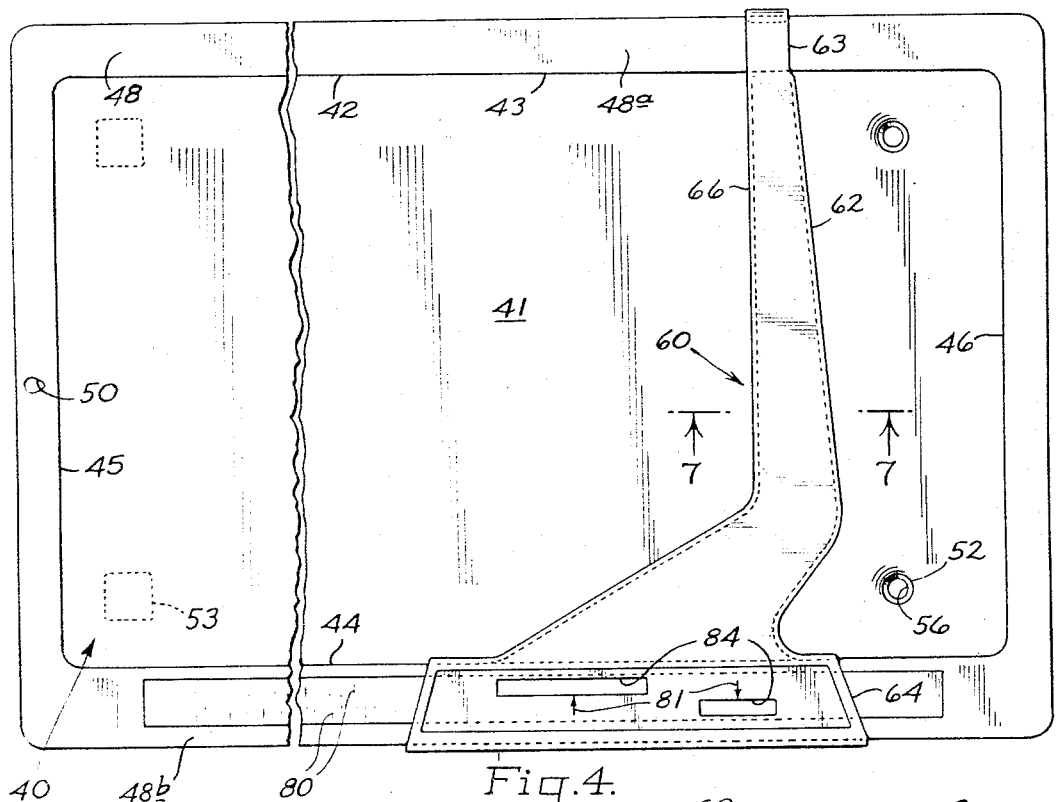
FIG. 4 is a top plan view of a measuring device according to another modification of the invention, the device in this instance including a tray which is completely enclosed by a border wall extending about the entire perimeter of the tray.

An irregularly shaped opening 50 is provided in rim 48 at the left end of the tray in FIG. 4. This opening includes a pointed extremity which indicates the midline of the tray, and constitutes indicator means in the invention.

During use of the tray, the infant's head is placed against end wall 45 with its feet projecting toward the opposite end of the tray. To assure snug positioning of the infant's head against end wall 45, the tray is designed to slope slightly toward the left, when placed on a support such as a table. The slope is provided by integrally forming in the floor posts 52 which project downwardly from the base of the floor. Pads (rubber or felt), such as those shown at 53, may be secured to the opposite end of the tray, to provide a nonslip characteristic. The posts elevate the right end of the tray a greater distance than the pads.

Figure 5:
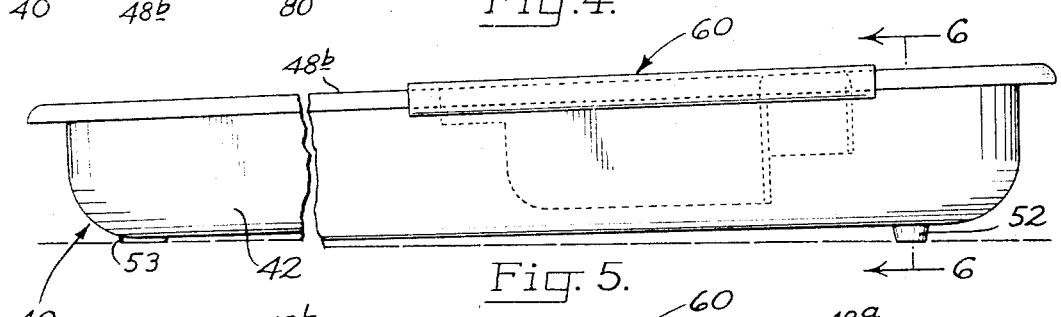
FIG. 5 is a side view of the tray illustrated in FIG. 4.
Figure 6:
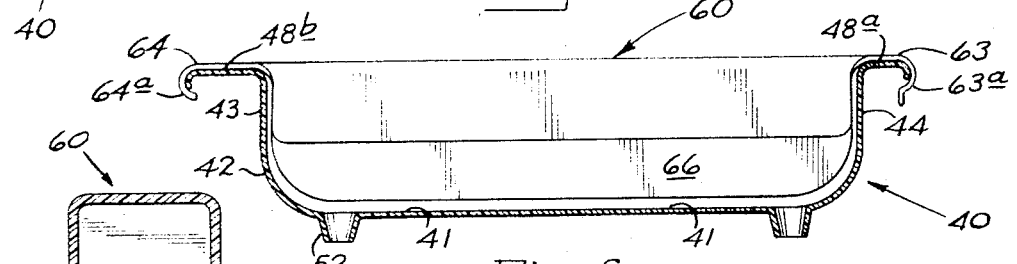
FIG. 6 is a cross-sectional view of the tray, taken generally along the line 6—6 in FIG. 4.
Figure 7:
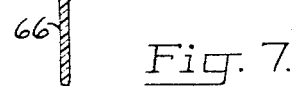
FIG. 7 is a cross-sectional view, taken generally along the line 7—7 in FIG. 4.

It is preferable that the posts be hollow, so that openings extend through them, as shown at 56. These openings facilitate cleaning of the tray, as they provide for the draining of wash fluid. They do not introduce much likelihood of soilage to the support for the tray and surrounding regions, because of the slope, and since the right region of the tray in FIGS. 4 and 5 is rarely contacted by the infant.

An adjustable foot support 60 is provided in this modification of the invention, which comprises an elongated arm 62 and extensions 63, 64 integral with the ends of the arm that overlie reaches 48a, 48b of the flange 48. The arm has a channel-shaped cross section, as shown best in FIG. 7, and an expanse or plate portion 66 which is disposed at right angles to the longitudinal axis of the tray, the latter constituting a foot-contacting plate portion in the foot support. A back flange 68 is braced to the front flange 66 as by braces shown at 70.

The extensions 63, 64 illustrated constitute riders which ride along rim reaches 48a and 48b to maintain the foot support in proper position within the tray, and plate portion 66 normal to the longitudinal axis of the tray. Each is preferably formed also as a clip, and includes a depending curved portion shown at 63a, 64a, respectively, which dips onto the rim to hold the foot support in place while permitting sliding movement. With the foot support ordinarily made of plastic which is somewhat flexible, longer curved portion 63a may be flexed outwardly to release the foot support when it is desired to clean the tray or the foot support.

In this embodiment of the invention, the foot support is guided for movement longitudinally of the tray by the elongated guide surfaces along the side of the tray presented by the rim reaches.

Two rows of calibrations partially shown at 80, are provided along rim reach 48b. One row of calibrations may be in centimeters, and the other in inches, and indicator arrows 81, printed or otherwise formed on the upper expanse of extension 64, point to the specific inch or centimeter reading applicable for a given setting of the foot support. Cut out windows 84, which alternatively may be clear plastic windows, permit viewing of the calibrations in regions adjacent the arrows.

This modification of the invention has the particular feature of completely enclosing on all four sides the space to be occupied by the infant, whereby there is maximum security against dropping of the infant. Further, the opposed end walls serve to stiffen the side walls, as already described. With the side walls functioning to guide the adjustable foot support, this stiffening is a desirable feature. By having the side walls guide the foot support, the floor of the tray may be flat and rendered most easily cleaned.

It should be apparent from the above that a novel type of device is contemplated which provides a valuable tool for pediatricians and their assistants in the making of accurate measurements of an infant or other subject. The device, regardless of the modification chosen, is light in weight, and easily cleaned, and permits accurate measurements to be taken.

While different embodiment of the invention have been described, it is appreciated that other variations and modifications are possible without departing therefrom. It is desired to cover all such modifications and variations as would be apparent to one skilled in the art, and that come within the scope of the appended claims.

It is claimed and desired to secure by letters patent:

1. A device for measuring infants comprising an elongated tray including a floor and an upright border wall joined to said floor, said border wall including opposed upturned side walls and an upturned end wall at one end of the tray, said upturned side and end walls bounding a space for cradling an infant with the infant extending longitudinally of the tray and its head against said end wall,
an adjustable foot support including an upright foot-contacting plate portion located within the tray and having opposite ends disposed inwardly of said side walls, said side walls and end wall extending upwardly from said floor a substantial distance above the base of said foot-contacting plate portion,
means guiding said foot support for movement longitudinally of the tray with the support staying between the ends of the tray and in a position extending transversely of the tray at an angle that remains fixed, said means guiding said foot support comprising opposed laterally spaced elongated guide surfaces extending along the tray between the ends of the tray and having upper margins exposed to the top of the tray, which guide surfaces are disposed above the bottom of the tray floor whereby the floor is not parted by such surfaces,
said adjustable foot support including rider means that rides on, while being guided by, said guide surfaces, and
calibrations disposed in a row extending along the length of the tray and means on the foot support cooperable with said calibrations to enable a reading to be made with said foot support adjusted to a given position against an infant's feet.

2. The device of claim 1, wherein said upturned end wall has indicator means thereon indicating a position midway between said upturned side walls of said tray.

3. The device of claim 1, wherein said tray floor is imperforate extending from said one end of the tray floor a major part of the distance to the tray's opposite end.

4. The device of claim 1, wherein said border wall is open at the end of the tray opposite the tray's said one end, and the means guiding said foot support comprises an elongated shallow groove extending longitudinally of the tray in the floor of the tray located between the upturned side wall, said groove having a base which lies above the bottom of the tray floor whereby the floor is not parted by the groove, said groove having an open end at the tray's said opposite end.

5. The measuring device of claim 1, wherein said laterally spaced elongated guide surfaces of the means guiding said foot support extend along upper margins of the side walls of the tray.

6. The measuring device of claim 5, wherein the tray further includes an upturned end wall at the end of the tray opposite the tray's said one end, and the upturned end walls and side walls form a border wall which extends continuously about the perimeter of the tray, said upturned end walls at opposite ends of the tray serving to stabilize the upturned side walls of the tray.

7. The measuring device of claim 6, wherein each of the side walls of the tray includes along its upper margin an elongated reach of rim extending longitudinally of the tray, said guide surfaces are part of said reaches of rim, and said rider means comprising extensions joined to opposite ends of the foot-contacting plate portion that overlie and ride on said reaches of rim.

8. The device of claim 7, wherein each of the extensions comprises a clip which clips onto its associated reach of rim.

References Cited

UNITED STATES PATENTS 2,301,574   11/1942   Oot et al.

FOREIGN PATENTS 410,294   3/1910   France.

HARRY N. HAROIAN, *Primary Examiner.*

U.S. Cl. X.R.

33—169